Sept. 27, 1949.  N. RYCROFT  2,483,154
ELECTRIC HEATING SYSTEM FOR BUILDINGS
Filed June 11, 1946  3 Sheets-Sheet 2

Inventor
NORMAN RYCROFT
BY Marshall and Marshall
Attorneys

Sept. 27, 1949.   N. RYCROFT   2,483,154
ELECTRIC HEATING SYSTEM FOR BUILDINGS

Filed June 11, 1946   3 Sheets-Sheet 3

Inventor
NORMAN RYCROFT
BY Marshall and Marshall
Attorneys

Patented Sept. 27, 1949

2,483,154

UNITED STATES PATENT OFFICE 2,483,154

ELECTRIC HEATING SYSTEM FOR BUILDINGS

Norman Rycroft, Blackdown, Leamington Spa, England, assignor of one-half to Cornercroft Limited, Coventry, England, a company of Great Britain Application June 11, 1946, Serial No. 675,876
In Great Britain July 5, 1945

6 Claims. (Cl. 219—39)

This invention has reference to an electric heating system for buildings with especial reference to heating systems utilising a liquid as the heating medium and has for its object to provide an improved electric heating system which can readily be installed in new or existing buildings, which is economical in current consumption and which does not require the use of large diameter pipes for the transmission of the liquid medium and which furthermore can be made relatively foolproof and automatic in operation.

According to the invention an improved electric heating system for buildings utilising liquid as the heating medium is characterised in that electric heating means is provided for heating the liquid medium at a plurality of points throughout the system and in that means is provided for force circulating the liquid medium around the system.

Figure 1:
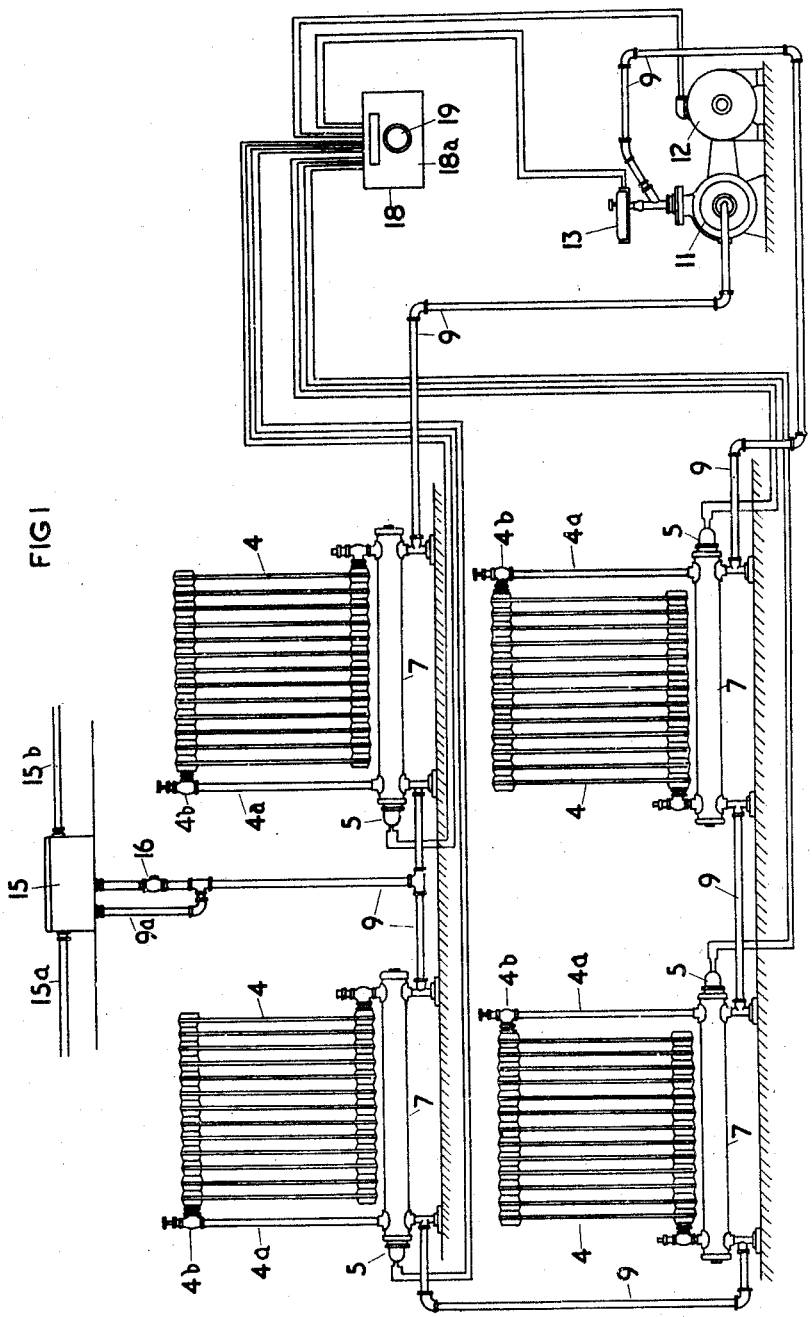

The invention will now be described with particular reference to the accompanying drawings wherein:

Figure 1 is a general arrangement view showing somewhat diagrammatically the improved electric heating system as adapted for the heating of a two story building.

Figure 2:
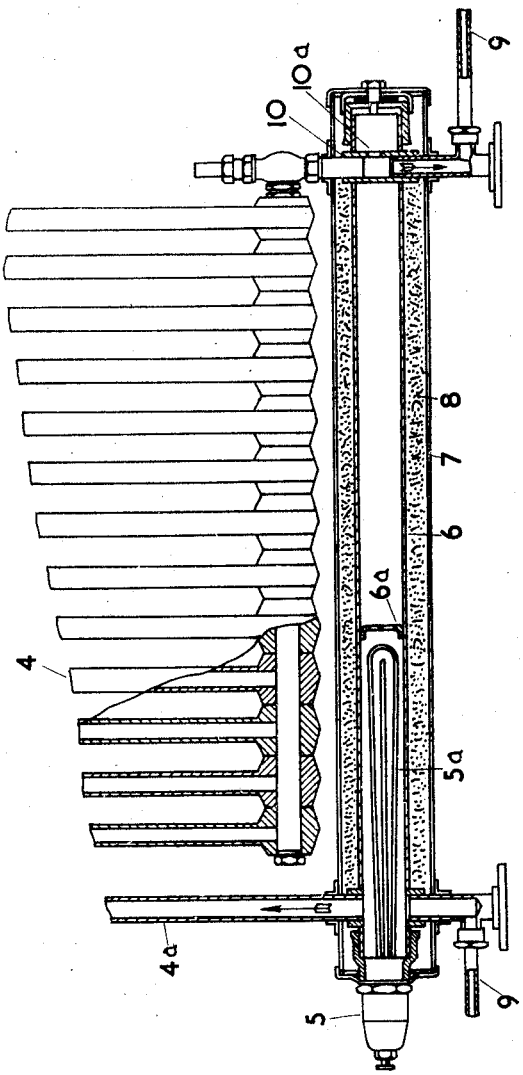
Figure 3:
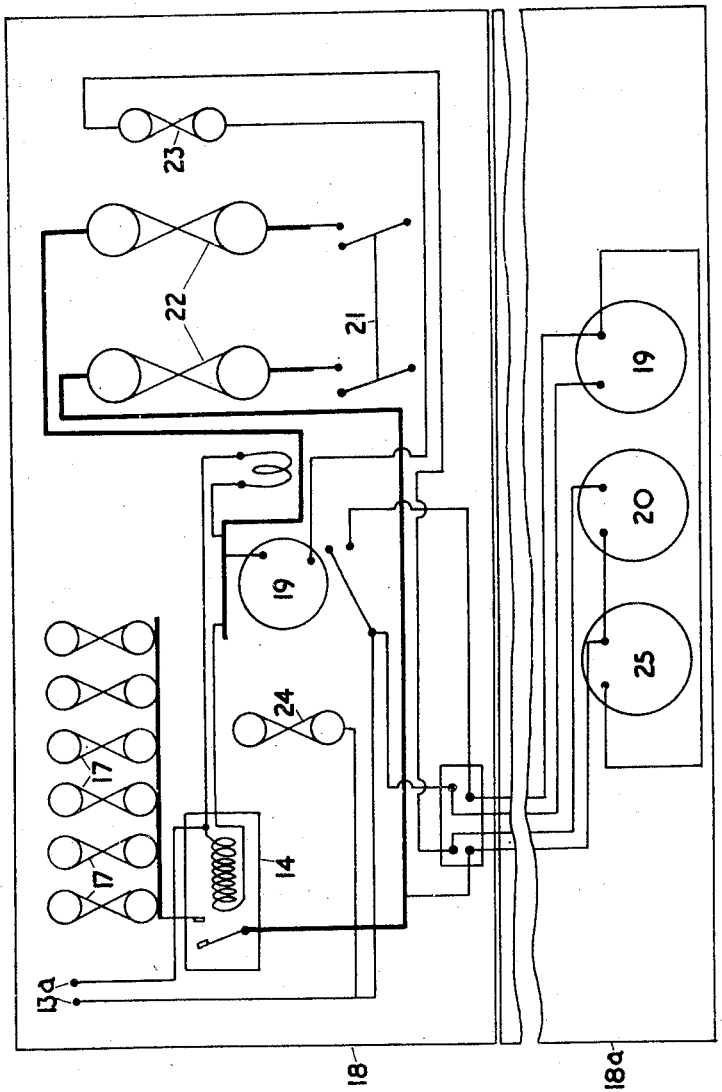

Figure 2 is a fragmentary view on an enlarged scale showing in greater detail the manner of incorporating an electric heating means of the immersion heater type with a liquid heated radiator as used in the arrangement illustrated in Figure 1 and Figure 3 is a diagram illustrating the remote control system utilised in connection with the arrangement illustrated in Figure 1, together with the relevant electric circuits.

Disposed within a building at any place where heating is required is a water radiator 4 of normal construction and located below each radiator 4 is an electric heating means which is of the immersion heater type and which is designated generally by the reference numeral 5. The resistance element 5a of a heater 5 is located within a tube 6 which in turn is surrounded by a tubular housing 7 with a lagging 8 of a material of poor heat conductivity say for example asbestos wool or glass wool packed into the space between a tube 6 and a housing 7.

At one end a tube 6 has communication with an inlet section of pipeline 9 leading from a preceding part of the system and with the usual rising intake pipe 4a of a radiator 4.

Disposed within a tube 6 intermediate the ends thereof is a perforated baffle plate 6a as and for a purpose to be described hereinafter.

The outlet from a radiator 4 is led by way of a length of pipe 10 which passes through the respective housing 7 and tube 6 but which is provided with an aperture 10a which opens into the interior of the relevant tube 6 so that the heaters 5 can be regarded as being connected in parallel with the water radiators 4.

Each water radiator 4 is provided with the usual cut off valve 4b.

The inlet end of the pipeline 9 is connected to the outlet from a pump 11 adapted to be driven by an electric motor 12 whilst the return length of the pipeline 9 is connected to the inlet of the said pump 11.

The provision of the aperture 10a opening into a tube 6 serves to ensure a positive circulation of the water through a radiator 4 since the pump 11 is enabled by this arrangement to exert a more or less full suction effect on the water circulating through a radiator 4 at the outlet end of the said radiator.

Disposed within the system adjacent to the inlet to the pump 11 is a settable thermostat 13 of a standard type which is associated with a tractive relay switch means 14 of known construction for controlling the circuit from the electric mains.

The pipeline 9 has communication with a header tank 15 by way of a nonreturn valve 16 and the said pipeline 9 also has communication below the valve 16 with an expansion pipe 9a opening into the header tank 15. The header tank 15 is fed from the water mains 15a and is provided with a ball control valve of known kind not shown and with the usual overflow pipe 15b.

Each of the immersion heaters 5 is connected electrically with a fuse 17 in a control box 18 which is located at a predetermined control position.

The switch controls for the immersion heaters 5 and for the electric motor 12 are associated with a clock controlled time switch 19 of known kind which also is located in the control box 18. The time switch 19 is associated with a control switch 20 for putting the clock control into or out of circuit as may be desired.

Since the electrical apparatus is of known construction and since the electric circuit arrangements follow standard practice detailed description is not required and it will suffice to state that the leads from the thermostat 13 are connected to the terminals 13a of the control box 18 as seen in Figure 3 and that in the said figure the reference 21 denotes the main switch, the reference 22 the main fuses, the reference 23 the fuse for the circuit through the time controlled switch mechanism, the reference 24 the fuse in the circuit of the electric motor 12 and the reference 25 a switch for arbitrarily completing the circuits through the heaters 5 and the electric motor 12.

The control box 18 is of the type in which the opening of the cover 18a simultaneously occasions the breaking of all the electrical circuits.

Assuming the main switch 21 is in the circuit making position the operation of the invention is as follows:

The thermostat 13 is set to make or break the circuit through the heaters 5 according as to whether the temperature of the water in the pipeline 9 adjacent to the inlet of the pump 11 rises above or falls below the predetermined temperature conforming to the setting of the said thermostat 13.

The switch 25 is then manipulated to complete the circuit through the heaters 5 and the pump motor 12 whereupon the pump comes into action and causes water to be circulated through the pipeline 9 and tubes 6. During its passage through the tubes 6 the water is heated by the immersion heaters 5 and if the valves 4b of the individual water radiators 4 are open the heated water circulates through a radiator 4 in the manner of a normal water heating system.

If a radiator valve 4b is shut the water passes through the relevant tube 6 and is subjected to heating since the restriction to flow afforded by the perforated baffle plate 6a ensures that water remains in the tube for a period of time which ensures heating without involving any heating of the room in which the shut off radiator 4 is located since radiation of heat from a tube 6 is prevented by the lagging 8.

When the predetermined temperature is attained the thermostat 13 cuts out all the heating elements 5 until such times as the temperature falls below the predetermined figure. Meanwhile however the pump 11 continues to circulate the liquid around the system.

If time control is required the control switch 19 is set to make or break all circuits at an appointed time and the switch 20 is manipulated to put the time control switch 19 into circuit.

The header tank 15 provides for "make up" of any losses of water and may be introduced at any convenient position in the system.

As the water is force circulated around the system the pipelines 9 may be of small diameter thus making for economy in the volume of water required to be dealt with by the pump 11 and also facilitating an unobtrusive arrangement of the pipeline 9.

Also it will be appreciated that the invention makes for economy in electric current consumption since heating continues when one or more water radiators 4 are out of action only so long as a predetermined temperature of the liquid medium is not exceeded.

Further in the case of a private dwelling house or of a block of offices heating is only effected at precisely those positions where it is required.

Although the immersion heaters 5 may conveniently be associated with water radiators 4 it should be pointed out that if desired the immersion heaters 5 can be located in other positions in the pipeline 9 and not necessarily made a unit fixing with a water radiator 4 as illustrated in the drawings.

Again although in the construction illustrated the fuses for the heaters 5 are located in the central control box 18 the said fuses if preferred may be located adjacent to each immersion heater 5.

A heating system in accordance with the invention is readily installed and may be made substantially foolproof and automatic in operation so that the system can be run with a minimum of attention and by relatively unskilled labour.

I claim:

1. A heating system for buildings utilising liquid as the heating medium comprising, in combination, a single loop of pipeline, a plurality of heating means for heating the liquid medium at a plurality of points throughout the system and means for force circulating the liquid medium around the system.

2. An electric heating system for buildings utilising liquid as the heating medium comprising, in combination, a single loop of pipeline, a plurality of electric heating means interposed in the system at a plurality of points and pump means for ensuring a forced circulation of liquid around the system.

3. A heating system for buildings utilising liquid as the heating medium, comprising a single loop of pipeline, a plurality of heat radiating means each connected in parallel with a portion of said pipeline, electric heating means disposed within the pipeline at a plurality of points in the line of flow of the liquid therethrough and a pump for forcing liquid around the pipeline.

4. A heating system for buildings according to claim 1 in which all of the heating means are thermostatically controlled in response to variation in temperature of the liquid by a thermostatic control located on the return side of the means for force circulating the liquid.

5. A heating system for buildings as claimed in claim 3 in which each of the heat radiating means is provided with a valve whereby it can be individually disconnected from the system.

6. A forced circulation liquid heating system for buildings comprising, in combination, a single loop of communicating pipeline, a power operated pump, the loop of pipeline leading from and returning to said pump and including a plurality of heating chambers, a heater associated with each of said chambers and mounted to heat the liquid as it passes through the associated chamber, a plurality of liquid radiators, each of said radiators being connected in parallel with one of said heating chambers and having a manually operable valve in its outlet connection, and a thermostatically operated control for all of said heaters located in said system at the return side of said pump.

NORMAN RYCROFT.

REFERENCES CITED

The following references are of record in the file of this patent:

UNITED STATES PATENTS

| Number | Name | Date |
|---|---|---|
| 1,067,647 | Fox | July 15, 1913 |
| 1,437,420 | Hill | Dec. 5, 1922 |
| 1,509,810 | MacIndoe | Sept. 23, 1924 |
| 1,763,328 | Robinson | June 10, 1930 |
| 1,945,139 | Duchemin | Jan. 30, 1934 |
| 1,980,299 | Smith | Nov. 13, 1934 |
| 1,985,215 | Shivers | Dec. 18, 1934 |
| 2,058,769 | Brown | Oct. 27, 1936 |
| 2,153,382 | Martin, Jr. | Apr. 4, 1939 |
| 2,375,870 | Ray | May 15, 1945 |